PHOTOELECTRIC INSPECTION SYSTEM IN WHICH A PLURALITY OF PHOTOCELLS HAS AN AMPLIFIER AND ANALOG-TO-DIGITAL CONVERTER ASSOCIATED WITH EACH PHOTOCELL IMMEDIATELY ADJACENT A MOVING SHEET FOR THE PURPOSE OF ACHIEVING NOISE IMMUNITY

Filed Jan. 15, 1968 5 Sheets-Sheet 1

June 2, 1970 HIROO AKAMATSU ET AL 3,515,883

PHOTOELECTRIC INSPECTION SYSTEM IN WHICH A PLURALITY OF PHOTOCELLS HAS AN AMPLIFIER AND ANALOG-TO-DIGITAL CONVERTER ASSOCIATED WITH EACH PHOTOCELL IMMEDIATELY ADJACENT A MOVING SHEET FOR THE PURPOSE OF ACHIEVING NOISE IMMUNITY

Filed Jan. 15, 1968 5 Sheets-Sheet 2

PHOTOELECTRIC INSPECTION SYSTEM IN WHICH A PLURALITY OF PHOTOCELLS HAS AN AMPLIFIER AND ANALOG-TO-DIGITAL CONVERTER ASSOCIATED WITH EACH PHOTOCELL IMMEDIATELY ADJACENT A MOVING SHEET FOR THE PURPOSE OF ACHIEVING NOISE IMMUNITY

Filed Jan. 15, 1968 5 Sheets-Sheet 3

PHOTOELECTRIC INSPECTION SYSTEM IN WHICH A PLURALITY OF PHOTOCELLS HAS AN AMPLIFIER AND ANALOG-TO-DIGITAL CONVERTER ASSOCIATED WITH EACH PHOTOCELL IMMEDIATELY ADJACENT A MOVING SHEET FOR THE PURPOSE OF ACHIEVING NOISE IMMUNITY
Filed Jan. 15, 1968 5 Sheets-Sheet 4
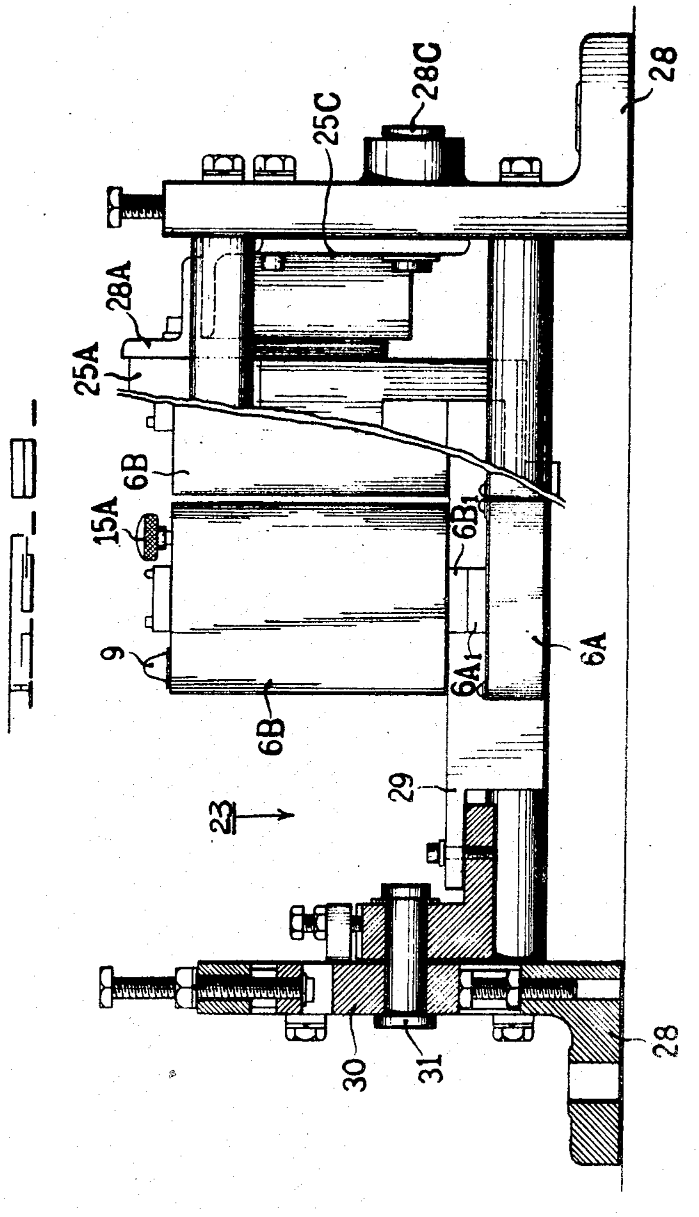

June 2, 1970 HIROO AKAMATSU ET AL 3,515,883

PHOTOELECTRIC INSPECTION SYSTEM IN WHICH A PLURALITY OF PHOTOCELLS HAS AN AMPLIFIER AND ANALOG-TO-DIGITAL CONVERTER ASSOCIATED WITH EACH PHOTOCELL IMMEDIATELY ADJACENT A MOVING SHEET FOR THE PURPOSE OF ACHIEVING NOISE IMMUNITY

Filed Jan. 15, 1968 5 Sheets-Sheet 5

United States Patent Office 3,515,883

Patented June 2, 1970

3,515,883
PHOTOELECTRIC INSPECTION SYSTEM IN WHICH A PLURALITY OF PHOTOCELLS HAS AN AMPLIFIER AND ANALOG-TO-DIGITAL CONVERTER ASSOCIATED WITH EACH PHOTOCELL IMMEDIATELY ADJACENT A MOVING SHEET FOR THE PURPOSE OF ACHIEVING NOISE IMMUNITY

Hiroo Akamatsu, Takatsuki, and Takanobu Morita, Kyoto, Japan, assignors to Tateisi Electronics Co., Ukyo-ku, Kyoto, Japan

Filed Jan. 15, 1968, Ser. No. 697,996
Claims priority, application Japan, Jan. 16, 1967, 42/2,987
Int. Cl. H01j *39/12;* G01n *21/16, 21/30*
U.S. Cl. 250—214 8 Claims

ABSTRACT OF THE DISCLOSURE

A defect detecting system comprises an examining section having a light projecting means and light receiving means, and control circuit means. The light receiving means primarily consists of photoelectric elements for receiving light reflected by a moving sheet or transmitted therethrough, amplifiers for amplifying electrical signals from said photoelectric elements, and analog-digital converters for converting the analog output of said amplifiers into digital signals by which defects are indicated. The digital signals are further sent to the control circuit means.

The present invention relates to a system for automatically detecting defective portions such as flaws, stains and holes in a sheet of cloth, paper or the like.

In a conventional system of this type, photoelectric elements are disposed in the detecting position so as to receive the light projected from light sources as it is reflected by a sheet or after it is transmitted therethrough, and the output of the photoelectric elements is by lead wires supplied to amplifiers in a control circuit which is placed apart from the detecting position. Accordingly, the lead wires connecting the photoelectric elements to the amplifiers pick up a noise, and even when the lead wires are shielded, the extension of the wires impairs shielding efficiency, so that the position of the control panel including the amplifiers and the control circuit is consequently limited. Furthermore, the output of a large number of amplifiers respectively connected to each of the photoelectric elements is led to a further located Schmitt circuit through an "or" circuit. Therefore, in case the width of the sheet varies, the photoelectric elements positioned outside the width and the amplifiers connected thereto must accordingly be cut off from the "or" circuit, the interruption further resulting in a variation of the output impedance in the rest of the amplifiers. Thus, the conventional apparatus was disadvantageous in that the gain of the amplifiers has to be adjusted once again.

In order to eliminate the above-described disadvantages, the present invention provides digital signals as the output signals produced by the detecting means which is disposed in the detecting position, said detecting means comprising photoelectric elements for receiving the light reflected by a sheet or transmitted therethrough, amplifiers for amplifying the electrical signals from said photoelectric elements and analog-digital converters for converting the analog output of said amplifiers into digital output.

Other objects and advantages of the present invention will become apparent from the following description with reference to the accompanying drawings, in which:

FIG. 8 is a front view partly in cross section of FIG. 6; and

FIG. 9 is a side elevation on an enlarged scale showing the light projecting means as it is taken out alone.

Figure 1:
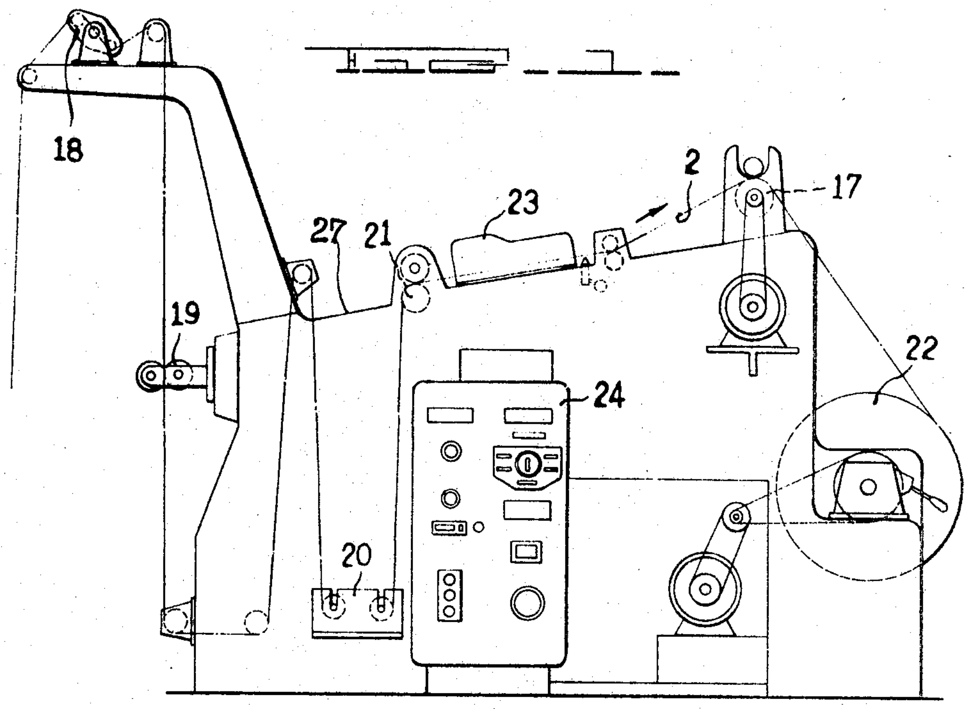
FIG. 1 is a front view of a cloth examining apparatus to which is applied a system for detecting defects in a moving sheet in accordance with the present invention.
Figure 2:
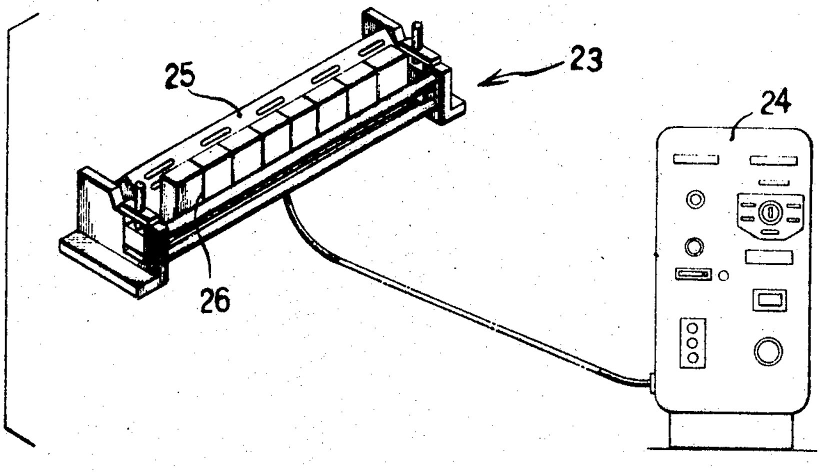
FIG. 2 is a schematic view showing the relationship between the detecting means and the control box of the present invention.

Now, referring to FIG. 1, numeral 2 indicates a moving sheet to be examined. The sheet is driven by a driving roller 17 to be sent toward the direction of an arrow through a swivel-type tension means 18, a cross-guider 19, a meandering correction means 20, and an expander 21, and is wound by a take-up roller 22. While the sheet is sent forward, it passes through a detecting means 23, where flaws, stains, soils, holes or thinner portions in the sheet are detected. The signals from the detecting means 23 are sent to a control box including a control circuit means 24.

Figure 3:
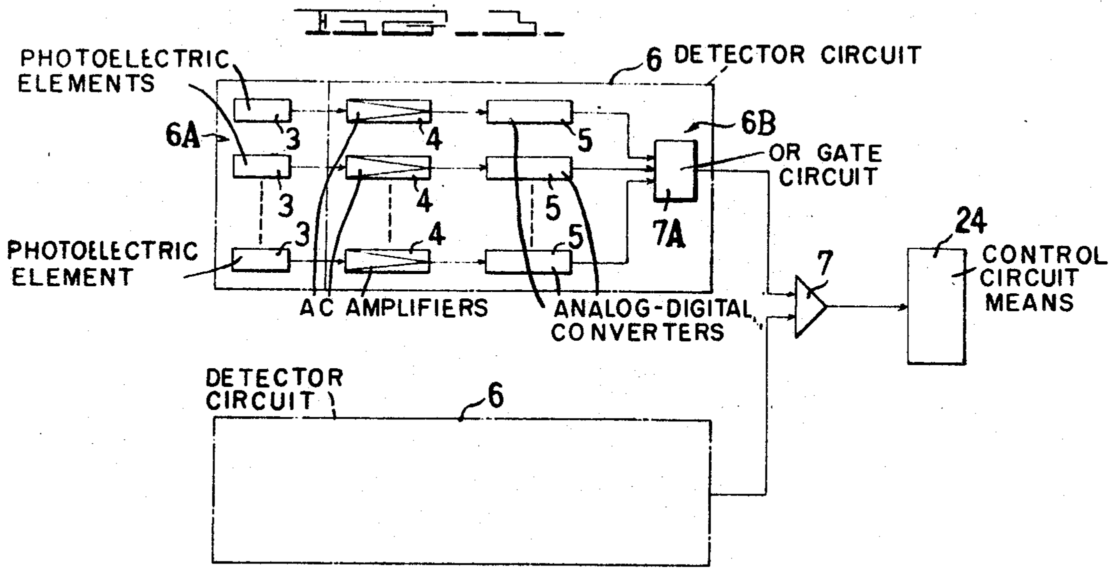
FIG. 3 is a structural view showing a primary circuit of the system for detecting defects in a moving sheet in accordance with the present invention.
Figure 4:
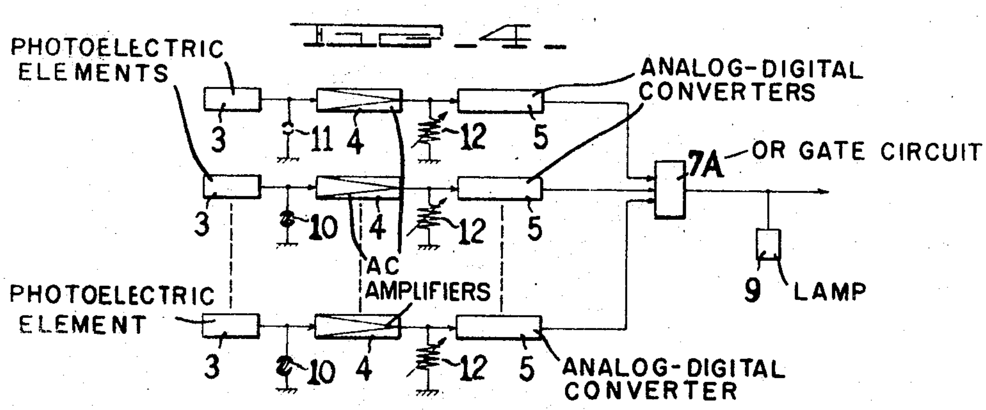
FIGS. 4 and 5 are views showing the structure of the circuit, more detailed illustrations than FIG. 3.

In FIGS. 3 and 4, 3 designates photoelectric elements, which are preferably embodied as solar batteries which are quickly responsive and which can produce variations in the output signals immediately upon detecting defective portions in the moving sheet 2. As apparent from the arrangement shown in the figures the photoelectric elements 3 receive light reflected by the moving sheet 2. Of course, the photoelectric elements 3 may also be adapted to receive the transmitted light. Numeral 4 indicates alternating current amplifiers in which a condenser cuts direct current components of the variations in the output signals produced by the photoelectric elements and which amplify only the alternating current components thereof. 5 indicates Schmitt circuits serving as an analog-digital converter for converting the analog output of the amplifiers 4 into the digital output. The serial circuits are connected to an "or" circuit 7A and disposed in an independent box 6B. In accordance with the width of the sheet 2, a number of boxes 6 are provided to form the detecting means 23. The output signals from the boxes 6 are digital signals, which are delivered to an "or" circuit 7 in the control circuit means 24. The signals produced by the "or" circuit serves to initiate the operation of a recording device or a machine for marking the sheet.

Figure 6:
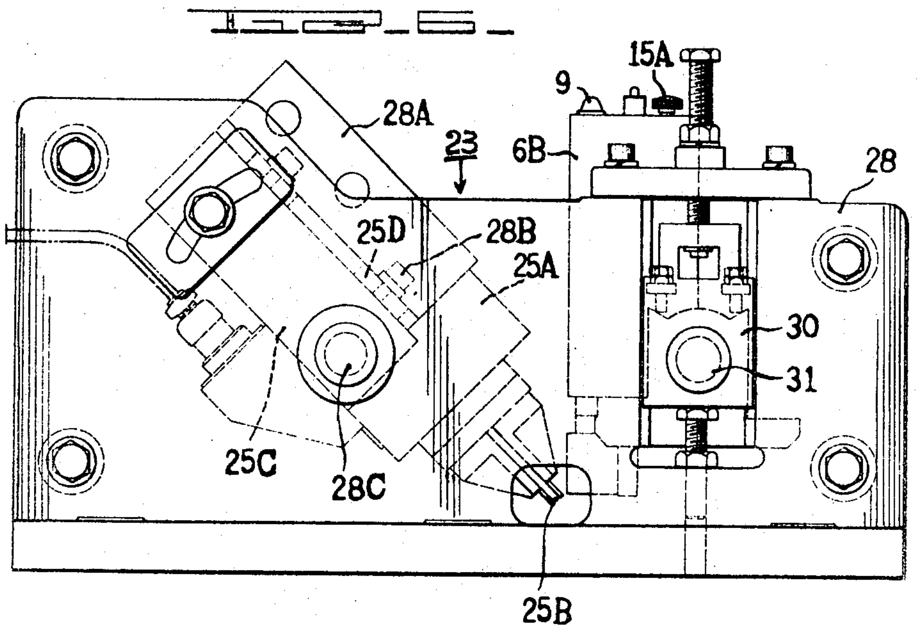
FIG. 6 is a side elevation showing the detecting means which is provided with a light projecting means and light receiving means.
Figure 7:
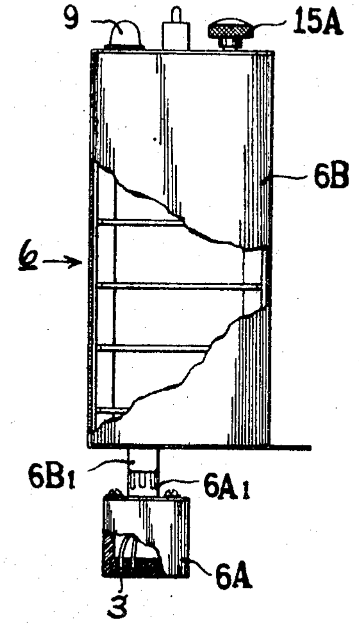
FIG. 7 is a side elevation on an enlarged scale and partly in cross section showing one unit of the light receiving means.
Figure 5:
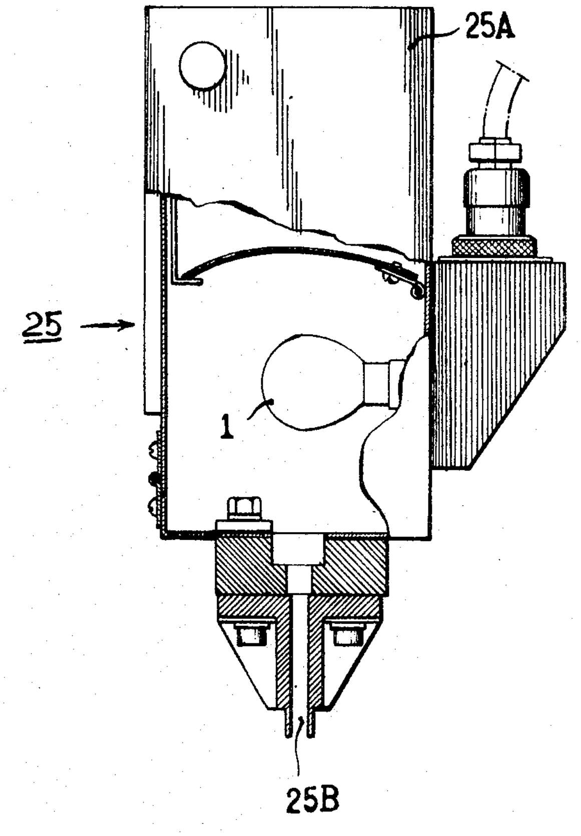

Now the structure of the aforementioned detecting means shown in FIGS. 6, 8 and 9 will be described. The detecting means 23 comprises a light projecting means 25 provided with light sources 1 and light receiving means 26 having boxes 6. In FIGS. 6, 7 and 8 each of the boxes 6 is shown as being divided into a box 6A including the photoelectric elements 3 and a box 6B having amplifiers 4, Schmitt circuits 5, and an "or" circuit 7A. However, the electrical connection between the two boxes 6A and 6B is provided by removable plug 6A1 and 6B1. Each of the boxes 6 is mounted on a supporting member 29 received by L-shaped frames 28 which are fixed to a main frame 27 as shown in FIG. 1. The supporting member 29 is integrally assembled with a slider 30 which is movable up and down in the frame 28. The slider is also made rotatable on a shaft 31.

The aforementioned light projecting means 25 has the light sources 1 within box 25A, the light from the light sources 1 being adapted to be projected on the sheet 2 through hole 25B. The box 25A has an angle member 25C which is slidably provided on an angle member 28A secured to the L-shaped frame 28. By means of an elongated opening 25D and a pin 28B, the box 25 is also fixed to a desired height above the sheet 2. Furthermore, the box 25A is made rotatable on a shaft 28C, the angle with respect to the sheet thereby being adjustable. As a result, even when the sheet differs in thickness and in the material, the height and angle of the light projecting means and light receiving means can be varied as desired, whereby reliable operation of detecting defects can be provided without causing any inconveniences.

Now the operation of the present system will be described. If there is any defect in the sheet 2, the photoelectric element 3 detects the defect and sends forth an output signal corresponding thereto, of which only the alternating current component is amplified by the alternating current amplifier 4. In the Schmitt circuit 5 connected thereto, the detecting level is so determined that the circuit may be brought into operation only in response to the signal beyond a specific level of the above mentioned defect detecting signal. Therefore, as a signal of detecting a defect, the circuit produces a pulse signal in response to the defect detecting signal which is beyond said detecting level.

As described above, the detecting means according to the present invention comprises at least photoelectric elements, amplifiers and analog-digital converters, and the detecting means is also adapted to be disposed in a detecting position, so that the amplifiers which tend to pick up noises can be positioned near the photoelectric elements thereby dispensing with long lead wires which conventionally connected the photoelectric elements to amplifiers. Being free of the noise the lead wires used to pick up, precise defect detecting operation is now effected.

Moreover, since the output of the detecting means is available as digital signals, even when some of the serial circuits comprising photoelectric elements, amplifiers and analog-digital converters are cut off from the "or" circuit 7 or the number of said circuits is increased in accordance with the variation of the width of the sheet, it is no longer necessary to readjust the gain of the amplifiers. Thus, the present system can readily be applied to sheets of different width, another effect achieved by the present invention. Furthermore, in case where the box 6 is divided into two boxes 6A and 6B, the box 6B alone can be removed, which facilitates handling sheets of different sizes. Maintenance and inspection can also be readily carried out.

Figure 5:
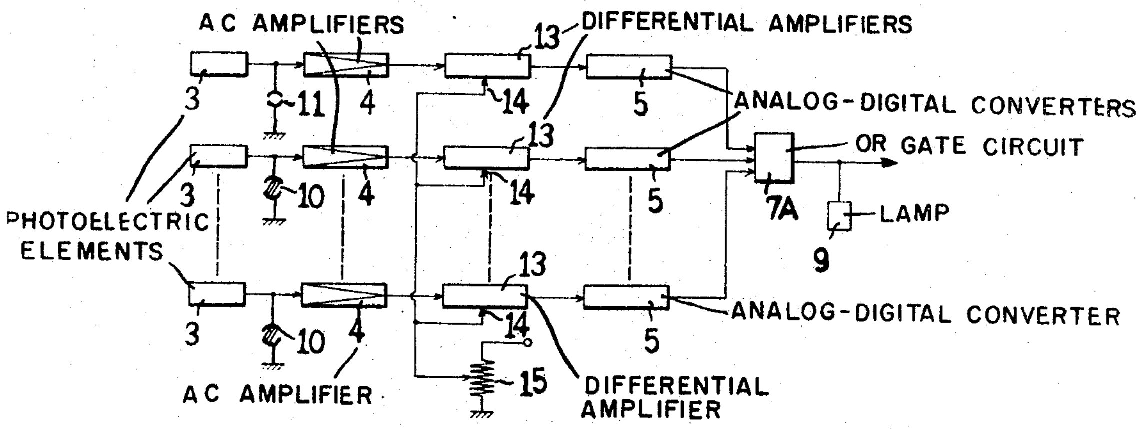

FIGS. 4 and 5 show an embodiment in which indicating lamps 9 are further connected to the "or" circuits 7A. Upon a part of the detecting means detecting defective portions, the lamp is turned on to thereby indicate the detection of the defects. Instead of the above-mentioned disposition of the lamps 9, a lamp 9 may be connected to the "or" circuit 7, in which case, the lamp 9 functions in response to the overall detective operation of detecting means. When the sensitivity in each of the boxes 6 is to be adjusted, the photoelectric elements are provided, for example, with the light through a normal flawless sheet while, at the same time, a pin 10 is inserted into a pin hole 11 in the portion other than the examining section thereby keeping the input of the amplifier at zero volt, with the input of the Schmitt circuit 5 adjusted by a variable resistance 12 so aa to effect the operation of the Schmitt circuit 5, namely, to turn the lamp 9 on. Then, most proximate to the Schmitt level and yet below said Schmitt level the input of the Schmitt circuit 5 is determined, whereupon the lamp 9 is turned out and the unit is now ready to detect all the defects that are detectable. By adjusting the sensitivity within each of the boxes 6 in the same manner as above, the sensitivity in all of the boxes 6 will be set at a uniform detecting level. When the adjustment is performed in a manner similar to the above-mentioned and by employing a defective sheet, the boxes can be adapted to detect defects larger than those in said sheet. In the conventional adjusting operation, the output of amplifiers, for instance, was set at a level by reading the output of each amplifier which was depicted on an oscilloscope. However, the oscilloscope involves such disadvantages that it is troublesome to handle and particularly difficult to operate for those who are not skilled to some extent. The present embodiment is advantageous in that its adjustment is simple enough for relatively unskilled people to perform.

In the aforementioned operation for adjusting the sensitivity, the variable resistances 12, for example, were operated to vary the input of the Schmitt circuits. However, since a plurality of Schmitt circuits are provided in the box 6, operating these resistances one by one involved extreme trouble. Therefore, as shown in FIG. 5, to the amplifiers and analog-digital converters are connected intermediate differential amplifiers 13 whose predetermined voltage 14 is so adapted as to be variable. By providing such structure the adjustment of the sensitivity can be facilitated only by manipulating a knob 15A. While the sensitivity in each of the boxes 6 may satisfactorily be set at the same level through the aforementioned adjustment so far as the characteristics of the amplifiers, differential amplifiers, analog-digital converters and the like are designed as strictly identical, such identical characteristics are eventually difficult to obtain, and accordingly, finer adjustment such as variation of the amplification degree in the amplifiers 4 should be made if desired. Since the detecting level in the boxes 6, once finely adjusted as above-mentioned, is kept entirely uniform, the sensitivity adjustment in the subsequent stage can be effected by varying the predetermined voltage 14 of respective differential amplifiers 13 through operating the variable resistances 15, namely only by manipulating the knobs 15A of said resistances. This is a very suitable manner of adjusting overall sensitivity when it is performed after the uniform detecting level has been attained.

Furthermore, the number of the boxes 6 to be employed may be determined as desired. As the width of the sheet to be detected increases, a greater number of boxes 6 are put to use. Since the boxes are each constructed as an independent unit, they can adjust themselves to the increased width without causing any difficulties. The readily replaceable unitary boxes 6 also facilitate maintenance and inspection of the detecting means 23. Due to the unitary structure of the detecting means, the present invention can accomplish such a remarkable effect that the central portion of the sheet is provided with a strict detecting operation with the marginal portions thereof being given a normal detecting operation.

Although the present invention has been described with respect to typical embodiments, the inventors do not wish to limit the invention only to the embodiments, but it is to be understood that the invention may also reside in the alterations, modifications and equivalents without departing from the principle of the present invention and the spirit of the inventors as set forth in the claims stated hereinafter.

What we claim is:

1. A system for automatically detecting defective portions in a moving sheet comprising detecting means secured at a fixed detection location immediately adjacent said moving sheet and control circuit means remotely located from said fixed detection location, said detecting means comprising a plurality of photoelectric elements for receiving light reflected by a sheet or transmitted therethrough, an amplifier for amplifying the electrical signal from each of said photoelectric elements, an analog to digital converter for converting the analog output of each of said amplifiers into digital output representative of a fault in said moving sheet.

2. A system for automatically detecting defective portions in a moving sheet as claimed in claim 1, wherein at least one lamp is so provided as to be turned on in response to the digital output signals from said analog-digital convertors.

3. A system for automatically detecting defective portions in a moving sheet comprising detecting means and control circuit means, said detecting means being disposed in a detecting position immediately adjacent said moving sheet and comprising a plurality of photoelectric elements for receiving light reflected by a sheet or transmitted therethrough, amplifiers for amplifying electrical signals from said photoelectric elements, differential amplifiers being loaded with the analog output of said amplifiers as one input thereof and with predetermined voltage as the other input thereof, and analog-digital converters for converting the analog output of said differential amplifiers into digital output, the predetermined voltage of said differential amplifiers being variable so as to adjust sensitivity, said control circuit means being constructed to receive the digital output signals of said detecting means at a location remote from said detecting position.

4. A system for automatically detecting defective portions in a moving sheet comprising detecting means and control circuit means, said detecting means having a light receiving means and a light projecting means, said light receiving means being provided with a plurality of boxes located immediately adjacent said moving sheet and each of which has therein photoelectric elements for receiving light reflected by a sheet or transmitted therethrough, amplifiers for amplifying electrical signals from said photoelectric elements, analog-digital converters for converting the analog output of said amplifiers into digital signals, said light projecting means having light sources which emit light on said light receiving means, and OR gate circuit means receiving the output signals of said analog-digital converters for generating a fault signal when the input signal of any one of said converter means exceeds a predetermined threshold, said control circuit means being constructed to receive the digital signal from said OR gate circuit means at a remote location.

5. A system for automatically detecting defective portions in a moving sheet as claimed in claim 4, wherein said at least one lamp is so provided as to be turned on in response to the digital output signals from said analog-digital converters.

6. A system for automatically detecting defective portions in a moving sheet as claimed in claim 4, wherein each of said boxes is divided into a first box having said photoelectric elements and a second box provided with amplifiers and analog-digital converters, said second box being electrically and mechanically mountable to, and removable from, said first box.

7. A system for automatically detecting defective portions in a moving sheet as claimed in claim 4, wherein said boxes mounted on a supporting member in readily removable manner, and said supporting member is received by a frame fixed to a main frame so as to be adjustable with respect to the height and angle against said sheet.

8. A system for automatically detecting defective portions in a moving sheet as claimed in claim 4 further comprising means for mounting said light projecting means to vary the distance between the same and said sheet and to vary the angle of incidence of said light on said sheet.

References Cited

UNITED STATES PATENTS

| | | | |
|---|---|---|---|
| 2,229,451 | 1/1941 | Gulliksen | 356—200 |
| 2,939,963 | 6/1960 | Rideout | 250—219 |
| 3,020,033 | 2/1962 | McCreanor et al. | 356—237 |
| 3,105,151 | 9/1963 | Nash | 250—219 |
| 3,124,289 | 3/1964 | Lynch et al. | 226—45 |
| 3,317,734 | 5/1967 | Martin | 250—219 |
| 3,298,373 | 8/1968 | Caswell | 307—235 |

RALPH G. NILSON, Primary Examiner

T. N. GRIGSBY, Assistant Examiner

U.S. Cl. X.R.

226—45; 250—219; 356—200